June 11, 1940.  F. A. PARSONS  2,203,743
MACHINE TOOL TRANSMISSION AND CONTROL
Filed Feb. 20, 1937   6 Sheets-Sheet 1

Inventor
Fred G Parsons
By
Attorney

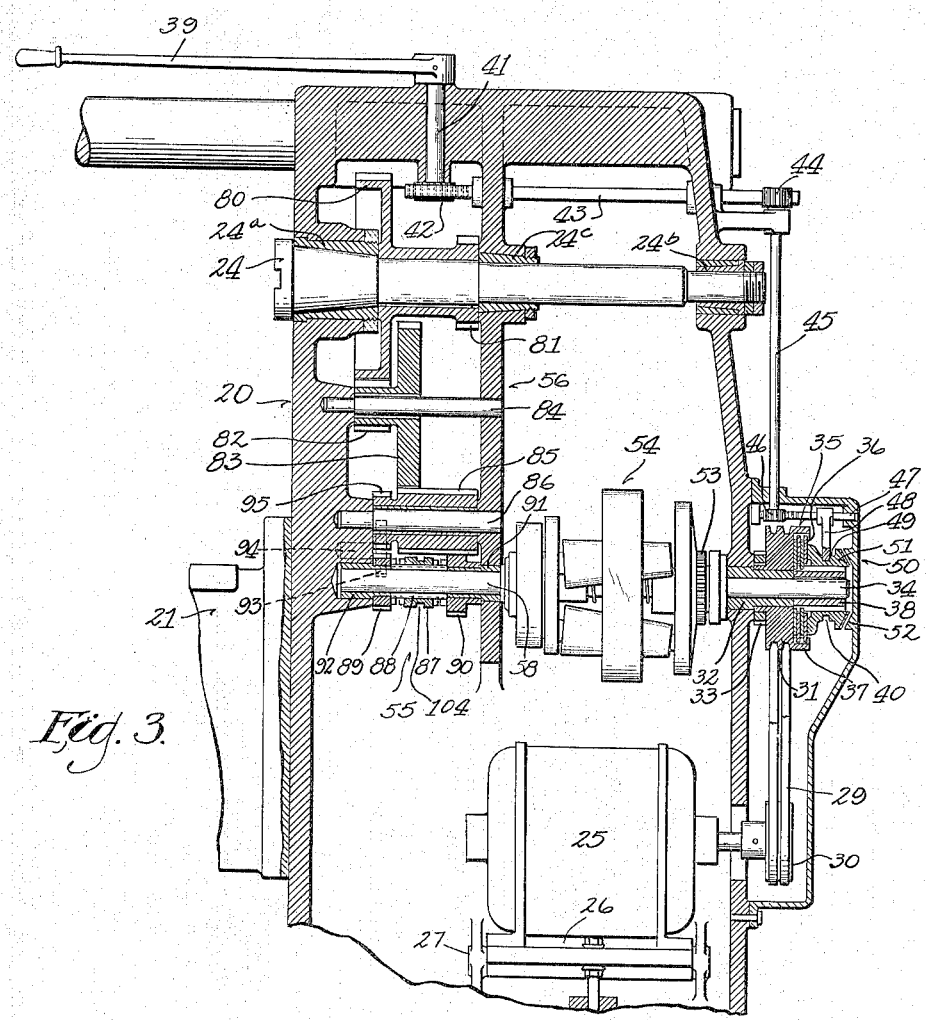
Fig. 3.
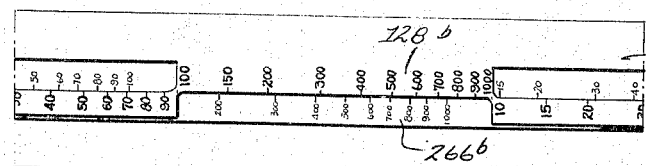
Fig. 10^A
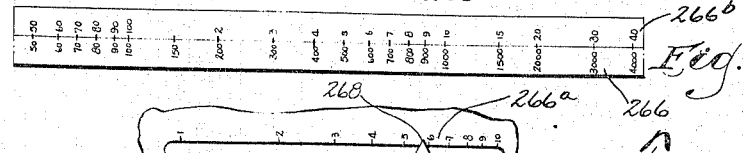
Fig. 10^B
Fig. 10^C
Inventor
Fred A. Parsons
By
Attorney

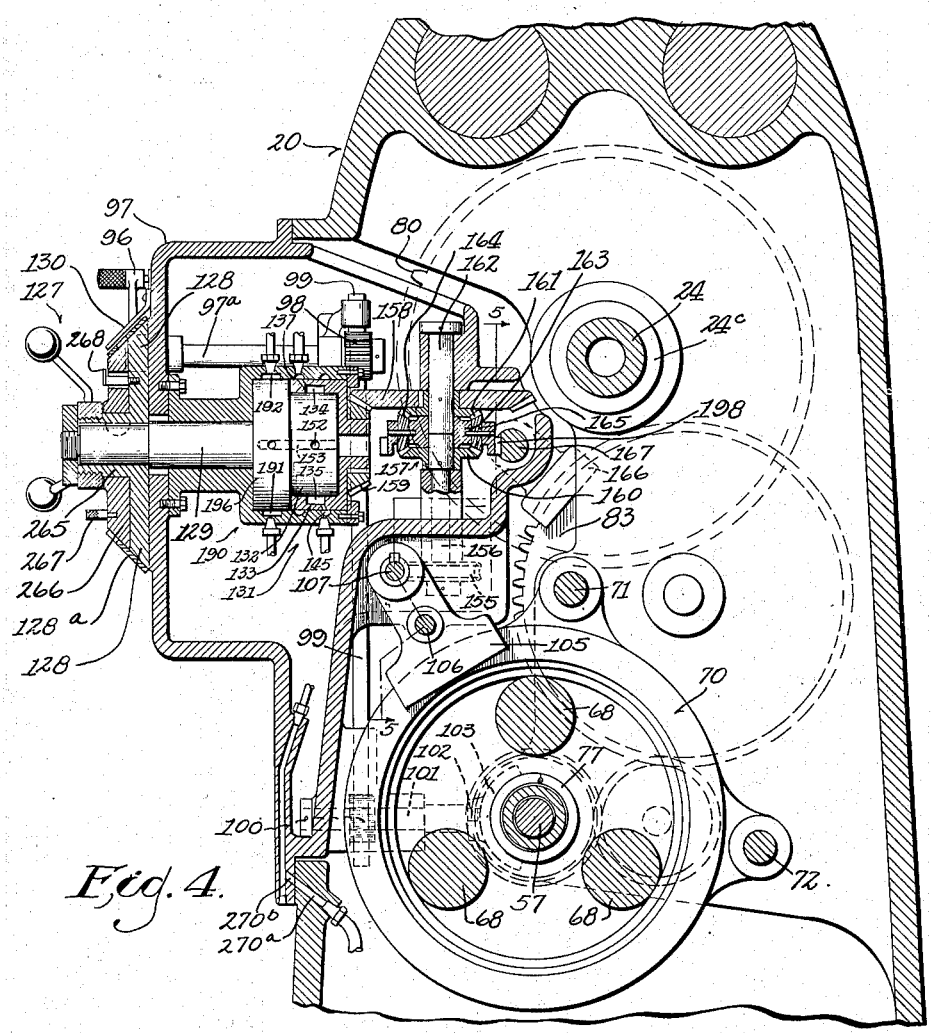
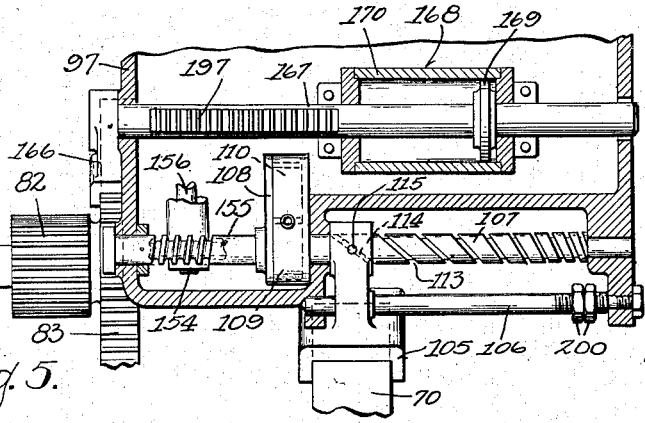

Inventor
Fred G Parsons

Attorney

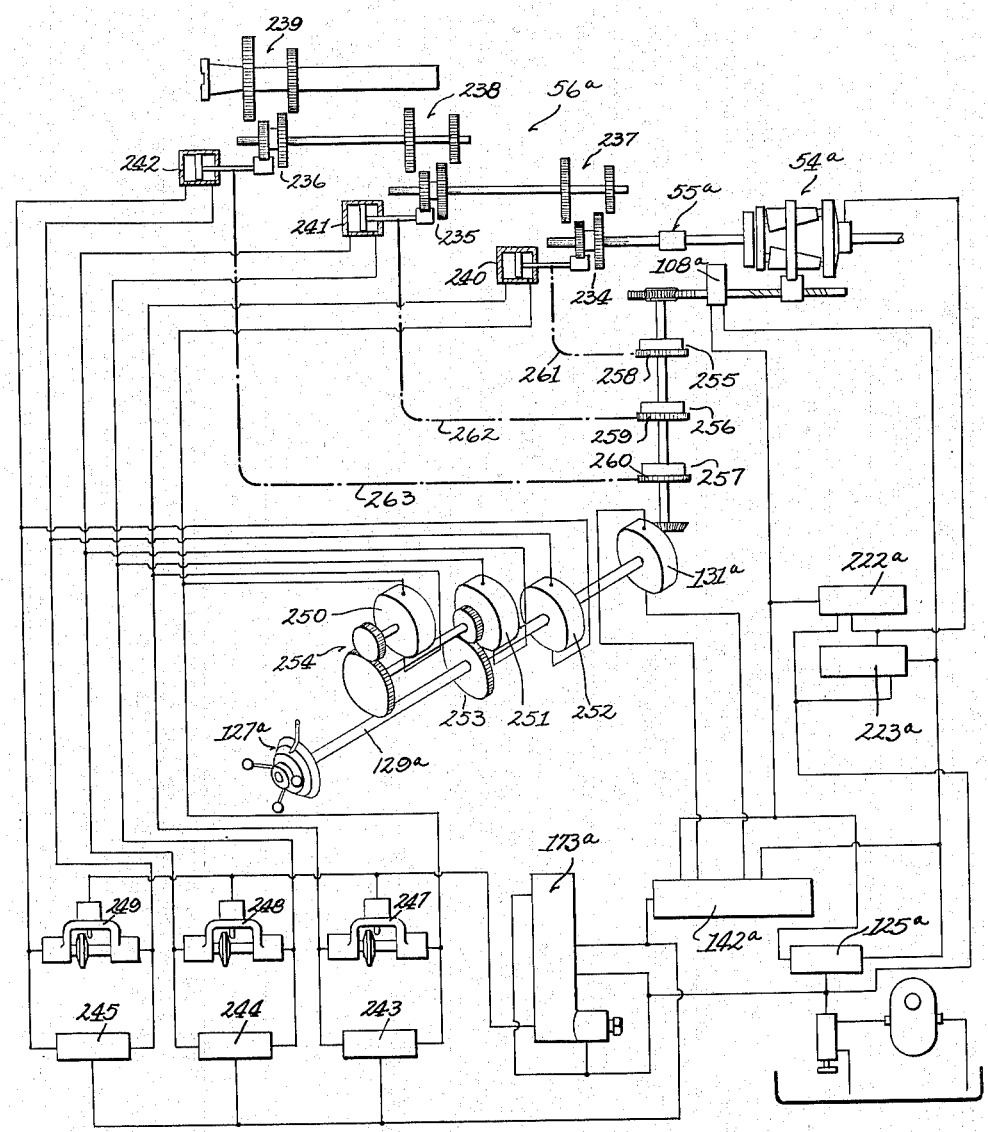
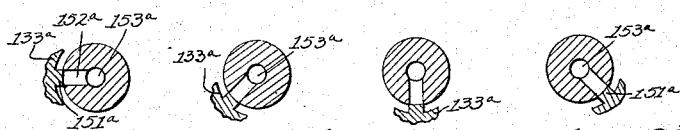
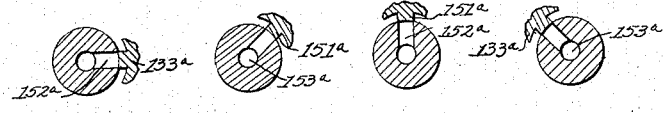
Fig. 11.

Patented June 11, 1940

2,203,743

UNITED STATES PATENT OFFICE 2,203,743

MACHINE TOOL TRANSMISSION AND CONTROL

Fred A. Parsons, Milwaukee, Wis., assignor to The Falk Corporation, Milwaukee, Wis., a corporation of Wisconsin Application February 20, 1937, Serial No. 126,779

47 Claims. (Cl. 74—328)

This invention relates to transmission and control mechanism, and more particularly for machine tools.

For many purposes, and particularly for machine tools, it is desirable to provide transmissions in which rate changes may be effected over a wide range while avoiding steps or gaps in the available intermediate rates, in other words to have available any speed within the range. Stepless transmissions of friction or hydraulic type are generally characterized by a reduction in available power output at slow speeds, in the friction devices the reduction resulting from friction slip, and in the hydraulic devices from a disproportionate increase in leakage of liquid out of the pressure portion of the system and for other reasons.

A purpose of the invention is to provide an improved rate change device which is capable of effecting any speed between a predetermined maximum and minimum rate without the reduction in available delivered power at slow speeds which is ordinarily characteristic of such transmissions, and particularly in a form adapted for machine tools.

A further purpose is to provide an improved transmission having infinitely small rate change increments over a wide range of rate adjustment, and improved control means therefor.

A further purpose is to provide an improved combination of shiftable devices respectively having different characteristics together with an improved combination of selector and controller means therefor to effect a transmission having preferred characteristic, for example to combinedly control shiftable gear or clutch devices serially arranged with a rate change device shiftable for effecting all speeds within its range.

A further purpose is to provide a rate changer with improved rate selective means and in a form particularly adapted for certain types of machine tools.

A further purpose is to provide a rate changer having adjustable rate selector means with improved controller and shifter means for effecting the selected rate.

A further purpose is to provide a rate change device or rate changer with improved control means including power operable means for shifting the rate changer to a selected rate position.

A further purpose is to provide a rate changer comprising a plurality of separately operable rate change devices with improved controller and shifter devices for effecting various position combinations of the different devices in accordance with the positioning of a single selector device.

A further purpose is generally to simplify and improve the construction and operation of transmission and control mechanism and particularly for machine tools, and still other objects will be apparent from this specification.

The invention consists of the structure as herein shown, described and claimed together with such modifications of the structure shown and described as may be equivalent to the structure claimed.

The same reference characters have been used to indicate the same parts throughout, and in the drawings:

Figure 3 is a developed section through the machine, showing certain transmission and other mechanism, the development representing a section taken approximately along line 3—3 of Fig. 2, and enlarged.

Figure 4 is a partial vertical section taken approximately along line 4—4 of Fig. 1 and enlarged.

Figure 5 is a partial section taken approximately along line 5—5 of Fig. 4.

Figures 10a, 10b, 10c are enlarged developed views of a selector chart and indicator device shown in Fig. 1.

Figure 11 diagrammatically shows a modified form of the transmission and control structure of the invention.

Figures 12a to 12h show progressive positions of certain valve members of a valve shown in Fig. 11.

Figure 1:
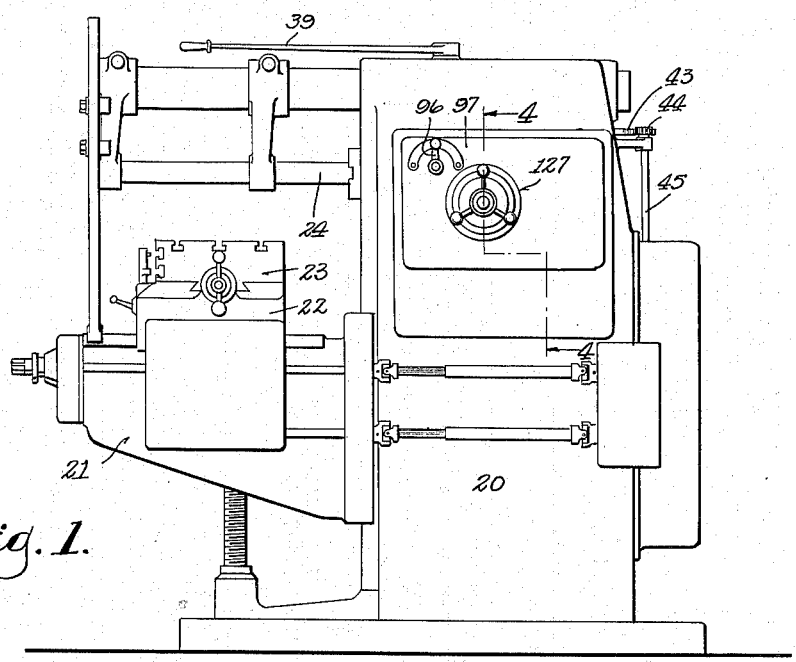
Figure 1 shows a right side elevation of a machine tool, in this instance a milling machine, which incorporates the invention.
Figure 2:
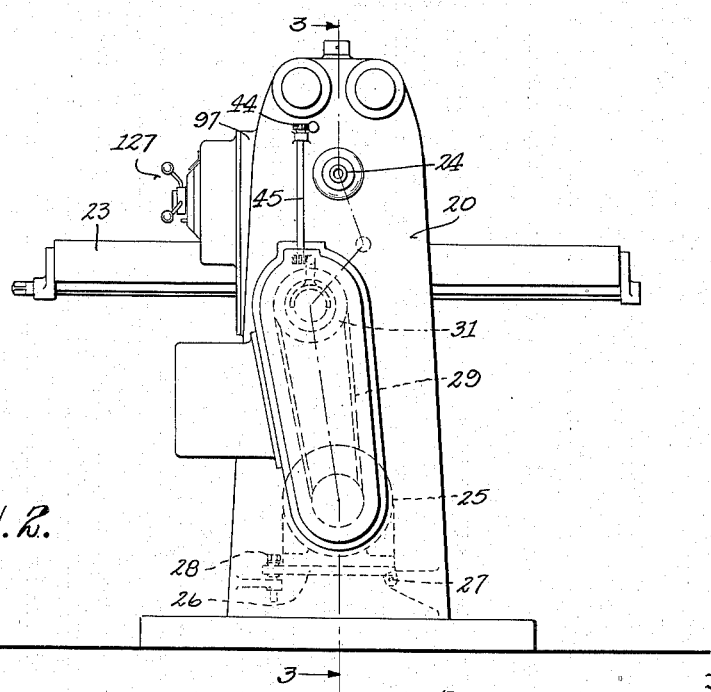
Figure 2 is a rear elevation of the same machine.

The milling machine shown in Fig. 1 includes a column 20, a knee 21 guided thereon for vertical movement, a saddle 22 guided on the knee for movement toward and from the column, and a work support or table 23 guided on the saddle for reciprocatory movement to right or left in Fig. 2. The several supports together provide table movement in three mutually transverse paths. For each of the movements mentioned the supports are provided with suitable slideways which are well known in various forms and are therefore not here shown or described in detail. A cutter spindle or support 24 is rotatably supported in column 20 by the means of suitable front, rear and intermediate bearings 24a, 24b, 24c, Fig. 3.

The machine is driven from a motor 25 bodily adjustable with a supporting bracket 26 about a pivot 27 by the means of an adjusting screw 28 whereby to adjust the tension of a belt means 29 which connects the motor pulley 30 with a main drive pulley 31 rotatable on a sleeve 32 which is fixed in column 20. Fixed with the pulley 31 is an initial drive gear 33 of a table rapid traverse rate train, for effecting non-cutting movements of the table, the train being driven at rapid traverse speed whenever motor 25 is actuated. Gear 33 is also used for driving a pressure fluid pump as later explained.

A shaft 34 is alternatively connectible or disconnectible with pulley 31 by the means of a main clutch generally denoted by the numeral 35, the clutch including a set of friction plates 36, the alternate plates being slidably keyed for revolution with an outer member 37 fixed with the pulley and with an inner member 38 keyed with the shaft, the plates being axially engaged to drive the shaft from motor 25 or permitted to disengage, whereby to disconnect the shaft, by the means of opposite movements of a hand lever 39 which is extended to the left in Fig. 1 to be manipulated by an operator at the front of the machine. Lever 39 shifts a clutch spool member 40 through a shaft 41, pinion 42, rack member 43, pinion 44, shaft 45, pinion 46, rack member 47 and a fork member 48 fixed on rack 47 and engaging an annular groove 49 in the spool member 40.

A transmission brake, generally denoted by the numeral 50 is engaged by the clutch disengaging direction of movement of lever 39, the brake including a brake member 51 fixed with the spool member 40, and a stationary brake member 52 fixed with column 20.

The shaft 34, when actuated, drives a gear 53 which is the initial gear of a table feed rate train used for the cutting movements of the table, and also drives a spindle transmission, both the table feed train and the spindle transmission being controlled by clutch 35.

The table feed and rapid traverse rate trains, respectively originating in the gears 53 and 33, Fig. 3, are connected for individual actuation of the knee 21, saddle 22 and table 23, whereby to effect table vertical, cross or longitudinal movements, by transmission mechanism which is not here shown since for the purposes of the present invention the connecting transmission and its control mechanism may be of any suitable well known form.

The spindle transmission includes a rate change device generally denoted by the numeral 54, Fig. 3, a spindle reverser generally denoted by the numeral 55, and another rate change device generally denoted by the numeral 56, the rate change devices being serially arranged for the rate changes effected by the device 54 to be modified and extended in range by the device 56. The position of reverser 55 between the rate change devices provides the complete range of spindle speeds in either direction of spindle rotation without reversal either of the rapid traverse rate train originating in gear 33, or of the feed rate train originating in gear 53, or of the rate change device 54.

The rate changer unit 54 is of a general form disclosed in the co-pending application Serial No. 52,095, filed November 29, 1935, and will therefore here be only briefly described. The rate changer includes a shaft 57, Fig. 6 which may be an integral extension of shaft 34, as here shown, or suitably coupled therewith, a driven shaft 58, a driving gear 61 fixed on the drive shaft, a driven gear 62 fixed on the driven shaft 58, which is coaxial with shaft 57, and gears such as 63 fixed on shafts such as 64, there being several of the gears 63, preferably three, equiangularly spaced and each simultaneously engaging the driving gear 61 and driven gear 62. Shafts 64 are each journaled in a cage, generally denoted by the numeral 65, which is supported for independent rotation co-axial with drive shaft 57, the cage including a sleeve portion 65a and flange portions 65b and 65c fixed with sleeve 65a and respectively carrying the bearings for the opposite ends of shafts 64, in this instance antifriction bearings such as 66, 67.

Fixed for rotation or integral with each of shafts 64 are conically tapered friction rolls such as 68, the axis of the shafts 64 being angularly disposed with respect to the axis of drive shaft 57, at such angle that the outer periphery of each of the conical rolls is parallel with the axis of the drive shaft. Frictionally simultaneously engaging the peripheries of each of the rolls 68 there is a non-rotatable friction ring 69 carried by a frame generally denoted by the numeral 70, the frame together with the ring 69 being adjustable in a path parallel with the axis of drive shaft 57, whereby to engage ring 69 with the rolls 68 at various points of different roll diameter, the frame being slidably guided for such movement on spaced guide members or rods 71, 72, Fig. 4, to be shifted by means later described. Ring 69 is prevented from rotation and carried by frame 70 in a manner permitting of a certain amount of adjustment relative to the frame whereby to simultaneously engage the periphery of each of the friction rolls 68 with equal pressure and at corresponding roll diameters, but since the details of the ring mounting do not concern the present invention they will not be here described.

Figure 6:
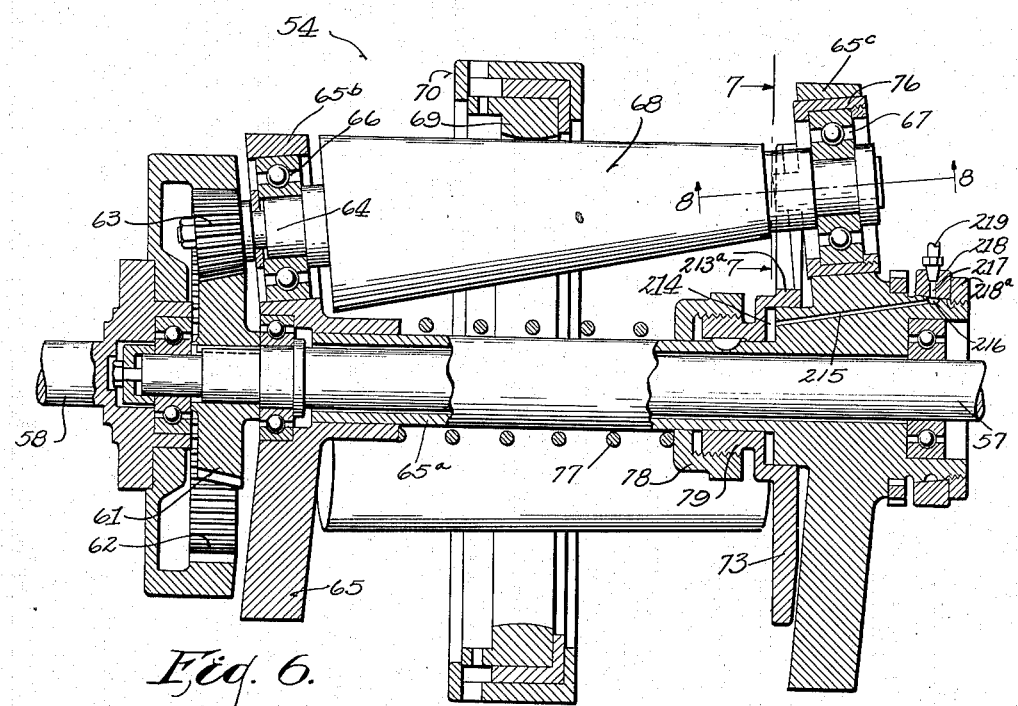
Figure 6 is an enlarged section through a rate change device shown in Fig. 3.

The friction contact between the rolls 68 and ring 69 forces each roll and its companion gear 63 to revolve whenever cage 65 is revolved and at a roll speed determined in part by the diameter of rolls 68 at the point of ring contact. As the ring 69 is axially shifted it contacts rolls 68 at points of differing roll diameter and changes the relative speed of the rolls. Thus as the ring is adjusted to the right in Fig. 6 the speed of rolls 68 and of the gears 63 increases, and vice versa, and the relationship of the various parts of the rate change device 54 is such that when shaft 57 is driven at a constant speed the adjustment of ring 69 will enforce a variable speed on driven shaft 58. With the parts proportioned as shown in Fig. 6, the speed of driven shaft 58 may be any speed from zero speed, obtained when ring 69 is nearly in its farthest position to the right, to a maximum speed which is somewhat less than the speed of drive shaft 57, depending on the ratio of the gearing between shafts 57, 58, the ratio of the smallest and largest diameters of rolls 68, etc.

Figure 7:
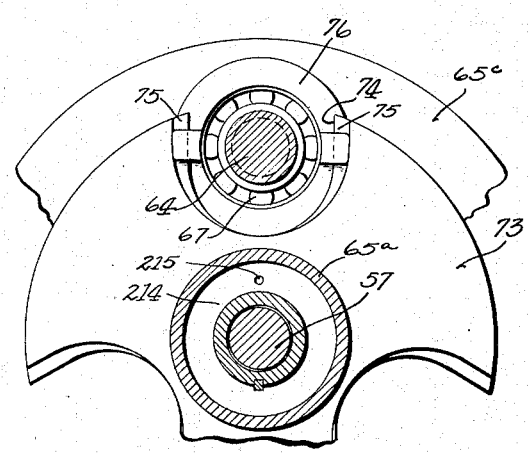
Figure 7 is a partial section taken along line 7—7 of Fig. 6.
Figure 8:
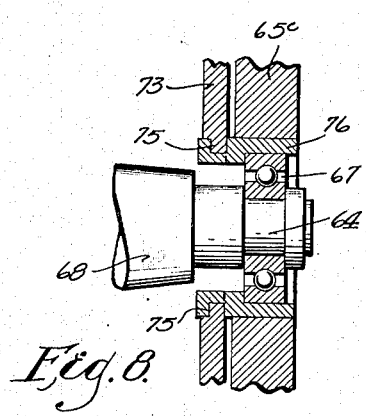
Figure 8 is a partial section taken along line 8—8 of Fig. 6.

Means are provided to normally effect a material friction pressure between the rolls 68 and ring 69. For this purpose the bearings 66, 67 are mounted to be unitarily axially slidable along their axes with rolls 68. Each of the rolls is continuously urged to the right in Fig. 6 by the means of a yoke 73 slotted as at 74, Figs. 7, 8, to provide ears such as 75 engaging a sleeve, such as 76, which carries the bearings 67, the yoke 73 being continuously urged to the right in Fig. 6, together with the sleeves, bearings and rolls, by the means of a spring 77, the spring pressure being adjustable by the means of a spring abutment member 78 threaded on the hub 79 of yoke 73. Forcing the rolls 68 to the right maintains friction pressure between the roll periphery and the friction ring 69 by reason of the angular relationship of the axes of shafts 64, and the relationship of the parts is such that in addition to the pressure of spring 77 an additional pressure, depending on the load carried by the rate changer, also operates to force the rolls to the right.

From the foregoing description it will be seen that the rate changer 54 includes a differential device, consisting of the co-axial driving and driven gears 61, 62 and the gears 63 which, together with rolls 68, have bodily rotation with the cage 65 and also peripheral rotation on their own axes, the rate of the bodily and peripheral rotation being simultaneously variable in accordance with the position of axial adjustment of ring 69. Assuming that shaft 57 and gear 61 are driven at constant speed such variation in bodily and peripheral rotation enforces a corresponding variation in the driven gear 62 and driven shaft 58. The axial position of ring 69 may, obviously, be such as to effect any output speed within the range of the maximum and minimum available speeds.

The rate changer 56 includes the different diametered gears 80, 81, Fig. 3, fixed on spindle 24 and the gears 82, 83 rotatable on a stud 84 and unitarily axially slidable, by means later described, for alternative engagement of the gears 80, 82 or 81, 83. In either position of the gear pair 82, 83 the gear 83 is driven from a gear 85 rotatable on a stud 86. The gearing of rate changer 56 taken in connection with the adjustment of rate changer 54 is such as to effect a high series of spindle speeds when gear 83 is shifted to engage gear 81, and a low series of speeds when gears 80, 82 are engaged. The range of each series of speeds is partly determined by the range of speeds available from rate changer 54 and partly by the ratio of the gear pairs 80, 82, and 81, 83. The ratio of the different gear pairs 80, 82 and 81, 83 is such that the lowest speed obtained in the high series is substantially equal to the highest speed obtained in the low series, whereby the arrangement taken in connection with the ability of rate changer 54 to effect all speeds within its range, provides rate change means in which an adjustment of the one or the other or both rate changers 54, 56 will effect any spindle speed within the combined range of the high and low series of speeds effected by rate changer 56.

The reverser 55 includes a clutch spool 87 slidably keyed on a sleeve 88 which is keyed to the output shaft 58 of rate changer 54, the spool 87 having clutch teeth on each end face engageable with complementary clutch teeth on the one or the other gear 89, 90 when the spool 87 is shifted in the one or the other direction. Gear 90 is rotatable on a fixed sleeve 91 and meshes directly with gear 85 to drive rate changer 56 in a forward direction. Gear 89 is rotatable on a fixed sleeve 92 and drives rate changer 56 at the same speed as gear 90, but reversely through an idler 93 rotatable on a stud 94 and a gear 95 fixed with the gear 85. Clutch spool 87 may be manually shifted to effect either direction of spindle rotation by the means of a hand lever 96, Figs. 1, 4, carried by a housing or frame 97 which is fixed on column 20, the lever operating through a shaft 97a, a gear 98, a rack bar 99, a gear 100, a shaft 101, and an eccentric pin 102 engaging a suitable bore in a shoe 103, which engages an annular groove 104, Fig. 3, in the clutch spool.

Figure 9:
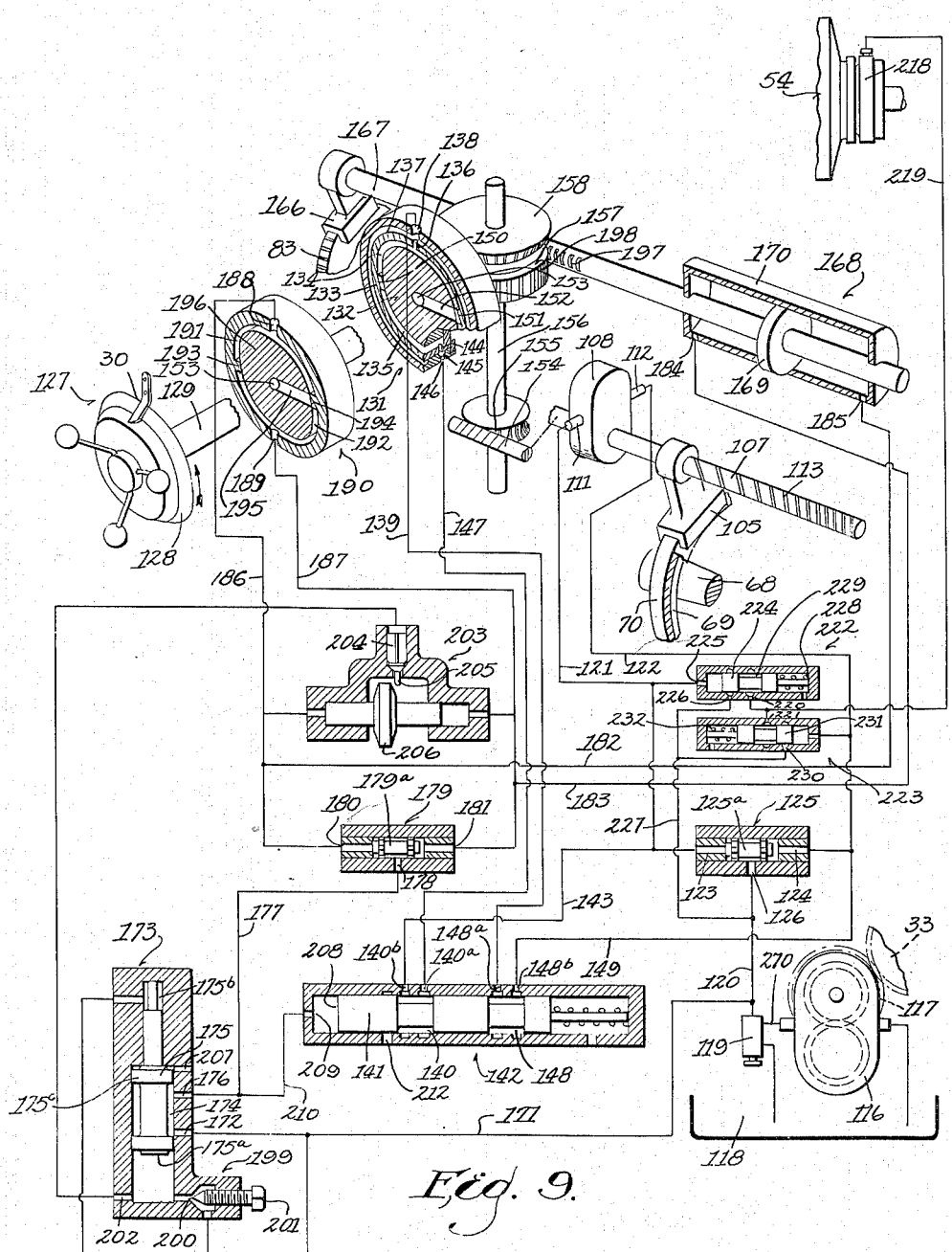
Figure 9 shows certain of the transmission mechanism of the machine and its control mechanism in simplified diagrammatic form, indicating the operative relationship.

The rate changers 54, 56 are manually controlled but power shifted by mechanism as follows:

For shifting the control ring 69, Fig. 6, of rate changer 54, the ring frame 70, Fig. 4 is engaged by a shifted fork 105, Figs. 5, 6, 9 carried on a stationary rod 106 and a rotatable shaft 107. Shaft 107 is rotatable by the means of a fluid operable motor 108 which, for simplicity, is here shown as a geared type which includes meshed gears 109, 110, the gear 109 being keyed to the shaft. It will be understood, however, that any other suitable type of hydraulic motor may also be used. Fluid is supplied to motor 108 through ports 111 or 112 respectively for rotation of shaft 107 in opposite directions. Shaft 107 is provided with a cam groove 113 of varying pitch or lead, for reasons later explained, the groove being engaged by a cam follower shoe 114, Fig. 5, fixed on a shank 115 which is pivoted in the fork member 105 to permit the shoe 114 to adjust its angle to suit the groove. Rotation of shaft 107 causes fork 105 to shift frame 70 and speed control ring 69 to right or left, Figs. 5, 9, according to the direction of shaft rotation.

Fluid for operation of motor 108, and of other devices later described, is supplied from a suitable source of continuous fluid pressure. In this instance a pump 116, Fig. 9, of any suitable type, is driven from gear 33, Figs. 3, 9 by a gear 117, the pump drawing fluid from a reservoir 118 to which all excess and waste fluid is returned by suitable channels, not shown, the pump delivering fluid through an adjustable relief valve 119 to a pressure line 120. Each of the ports 111, 112 of the motor 108 is connected to the pressure line 120, respectively through the channels 121, 122 originating in the different ports 123, 124 of a floating valve device 125, which is supplied with pressure fluid from a port 126, connected to the pressure channel 120.

The fluid supply of the motor 108 which shifts the rate changer 54 is controlled from a speed selector dial device generally indicated by the numeral 127, Figs. 4, 9. Selector 127 includes a speed indicator dial 128, fixed for rotation with a shaft 129, the dial being rotatable relative to an indicator 130 which is fixed on column 20. The specific construction of the selector 127 is later more particularly described in connection with Fig. 10, but for present purposes it is sufficient to state that it includes a logarithmic scale or chart indicating progressively increasing spindle speeds as the dial is rotated in the direction of the arrow, Fig. 9. A control valve 131 includes an inner member 132 fixed for rotation with shaft 129 and an independently rotatable member 133 co-axial therewith. Member 133 is provided with internal grooves or passageways 134, 135. The groove 135 continuously communicates with port 111 of motor 108, and also with the port 123 of floating valve 125, through a passage 144 in member 133, an annular groove 145 in the valve casing, a port 146 also in the valve casing, a channel 147, a port 148a and an annular groove 140 in a plunger 141 of a plunger valve 142, a port 140b and the channel 143. The groove 134 continuously communicates with the port 112 of motor 108 and also port 124 of the floating valve 125 through a passage 136 in member 133, an annular channel 137 in the valve casing, a port 138 also in the valve casing, a channel 139, a port 148a and an annular groove 148 in the plunger 141 of the plunger valve 142, the port 148b and the channel 149.

Valve member 133 is provided with partition elements 150, 151, spaced at 180 degrees, which separate the grooves 134, 135 at their adjacent ends. A leakage or vent port 152 in member 132 communicates with a leakage channel 153 and is of an arcuate extension substantially equal to that of the partition member 151. The leak port 152 is normally completely covered by the partition member 151 whereby no leakage can take place from either of the motor ports respectively connected with grooves 134, 135, but if the relative positions of rotation of valve members 132, 133 is altered then one or the other grooves 134, 135, together with the port of motor 108 which is connected therewith through the channels described, will be connected to the leak port 152 and vent 153. At the same time the corresponding port of floating valve 125 will also be connected to the vent and since this relieves the pressure at one end of valve 125 the floating member 125a will move in the direction of the open port to cover that port, thereby maintaining the pressure and fluid supply connection to the other port 123 or 124, and to the motor port which is connected therewith while leaving the one motor port connected to the vent. The result will be to effect rotation of motor 108 and of shifter shaft 107 in the one of the other direction, according to which motor port has been connected to the vent.

The shifter shaft 107 is connected for rotation of the valve member 133 whenever shaft 107 is rotated, the connection including a worm 154, Figs. 4, 5, 9, a worm wheel 155, a shaft 156, a differential device generally denoted by the numeral 157, and a pair of bevel gears 158, 159. Differential device 157 includes a bevel gear 160, Fig. 4, fixed on shaft 156, a bevel gear 161 fixed with the bevel gear 158 and with a shaft 162 co-axial with shaft 156, and a cage member 163 which is independently rotatable and carries the bevel gears 164, 165. The cage 163 is rotated during the shifting of rate changer 56, as later explained, but is otherwise stationary. The connections from motor 108 to the member 133 of valve 131 through the train just described, and from motor 108 to the rate control ring frame 70 through the cam groove 113, are such that during the several revolutions of shaft 107 required to shift the rate control ring 69, Fig. 6, from one to the other end of its normal movement, that is to say to effect the range of speeds required for spindle rate changes, the valve member 133 will make one half revolution, corresponding to the half revolution of the dial 128.

As previously pointed out, the arrangement of the rate changers 54, 56 is such as to provide a high and low range of speeds and any intermediate speed. The dial 128 of the selector 127 is marked in this instance through one half its periphery with spaced markings indicating a series of the speeds of the low range in their numerical order. The other half of the dial periphery is similarly marked to indicate a series of the speeds of the high range. Thus one half revolution of dial 128 and of member 132 of valve 131 represents, in either the high or low speed position of rate changer 56, the range of speeds effected during the adjustment of rate changer 54 required for spindle speed changes, and a complete revolution of dial 128 and valve member 132 represents all the spindle speeds available from the transmission including the high and low range and all speeds intermediate the highest and lowest speeds.

In order to adjust the transmission to effect the spindle speeds in an order corresponding to the dial markings it is necessary to retain the rate changer 56 in low speed position during the time the dial 128 progresses through its first half revolution, and at the same time to correspondingly progressively adjust the rate changer 54 from the minimum speed required for spindle rate changes to maximum speed position, then to abruptly return the rate changer 54 to minimum speed position when the dial has completed its first half revolution and substantially immediately afterward to shift the rate changer 56 to high speed position, and then, during the last progressive half revolution of the dial, to again correspondingly progressively adjust rate changer 54 from minimum to maximum speed positions.

The pressure fluid connections to valve 131 and motor 108, previously described, are such that whenever the dial is moved, whereby to indicate a different spindle speed, the leakage resulting from relative displacement of the leak port 152 and the co-operating partition 151 which normally closes the leak port, causes a direction of revolution of motor 108 which turns the connected valve member 133 to move the partition 151 in the same direction, which movement continues until the leakage port is again covered by the partition. This again stops the motor and the pressure fluid then locks the motor and rate changer 54 in adjusted position. As previously explained the connection of valve member 133 to rate changer 54 is such that a half revolution of the valve member corresponds to the full range of spindle speed adjustment of the rate changer 54. The connections also are such that when the dial 128 is in minimum speed position the rate changer 54 is in the minimum speed position required for spindle rate changes and the partition 151 is covering leak port 152. The result of the described construction and arrangement is that during the first half revolution of the dial 128 in the direction to progressively indicate the speeds from minimum to the maximum of the lower range the rate changer 54 is correspondingly progressively moved through its minimum to maximum range. The position of valve 131 as shown in Fig. 9 shows the valve at the completion of the first half revolution of the selector dial.

For shifting the rate changer 56 from its low to high speed position at the completion of the first half revolution of dial 128 the following mechanism is provided:

A shifter fork 166, Figs. 4, 9, engages the sides of gear 83 of the shiftable gear pair 82, 83 and is fixed on the piston rod 167 of a piston device generally denoted by the numeral 168, the device also including a piston 169 and a cylinder 170 which is fixed with housing 97. The opposite ends of piston device 169 are supplied with pressure fluid from pump 116 through the pressure channel 120, a channel 171, a port 172 of a valve device generally denoted by the numeral 173, annular groove 174 in the valve plunger 175, another port 176, a channel 177, the inlet port 178 of a floating valve 179 having outlet ports 180, 181, and the channels 182, 183 respectively connecting the outlet ports 180, 181 with the ports 185, 184 at opposite ends of the cylinder 170.

The channels 182, 183, Fig. 9, leading to cylinder 170 are also respectively connected through the channels 186, 187 to the ports 188, 189 of a valve device generally denoted by the numeral 190, Figs. 4, 9. Ports 188, 189 respectively communicate with semi-circular grooves 191, 192 in the casing of the valve device, the ends of the grooves being separated by partition members 193, 194 which are each of substantially the same arcuate extension as that of a leakage port 195 in an inner valve member 196, which is fixed on shaft 129 of selector 127, the leakage port communicating with the outlet or vent channel 153.

At the start and continuing during the first half revolution, previously described, of the dial 128, the groove 192 of valve device 190 is continuously connected to the leakage port 195, whereby to correspondingly connect one end of piston 169 and one port of floating valve 179 to the leakage port. During the last half revolution of the dial 128 the other groove 191, the other end of piston 169 and the other port of valve 179 are similarly connected to the leakage port 195. The position of valve 190 in Fig. 9 shows the valve at the completion of the first half revolution of the selector.

As soon as either end of piston 169, Fig. 9 is connected to the leakage port, as just described, the plunger 179a of floating valve 179 moves to cover the port 180 or 181 leading to the corresponding piston end, but the other piston end remains connected to the pressure source, whereby to move the piston 169 and gear unit 82, 83 of rate changer 56 in the direction corresponding to the position of valve 190. The connection described and arrangement of parts are such that during the first half revolution of dial 128 and valve member 196 the piston 169 is connected to maintain the rate changer 56 in its slow speed adjustment, while during the last half revolution of the dial the rate changer 56 is in high speed position, the rate changer being abruptly shifted from slow speed to high speed position when the dial completes its first half revolution and starts on the second half.

It is necessary, as previously noted, that following the completion of the first half revolution of selector dial 128, and preferably before rate changer 56 is shifted to high speed position, that the rate changer 54 should be shifted to slow speed position ready to proceed with the next succeeding slow to high speed movement during the second half dial revolution. To effect this return of rate changer 54 to slow speed position supplemental control is provided as follows:

The plunger 175 of valve 173, Fig. 9, has a large area end 175a and a small area end 175b each enclosed by the valve housing to form opposite acting pistons. Both these ends are supplied with fluid from the pressure channel 171, respectively through suitable ports but the plunger end 175a being of larger area the plunger is normally forced to the position shown in Fig. 9, in which the port 176 is connected to receive fluid from supply port 172 through the plunger groove 174. The supply of fluid to end 175a is through a needle valve device, generally indicated by the numeral 199, in which an opening 200 is adjustable by the means of a screw 201 to control the rate at which fluid may flow to the end 175a. At a point between the needle valve opening and the valve end 175a a port 202 is connected to a poppet valve device 203. Device 203 includes a poppet valve plunger 204 which is normally forced by the fluid pressure against a suitable seat, in which position no leakage can pass the seat. But when a projecting end 205 of plunger 204 is shifted by the movement of a cam 206 fluid may leak to drain the fluid from plunger end 175a faster than fluid is supplied through the needle valve. This relieves the pressure on end 175a and the plunger 175 is then immediately shifted from the position shown in Fig. 9 to a position in which the enlarged plunger portion 175c closes communication from pressure port 172 to outlet port 176, and opens port 176 to a drain port 207. This result ocurs each time the pressure is reversed in the channels 182, 183 leading to the piston 169 of the piston device 168 or, in other words, each time the selector dial is moved past a point where valve 190 operates to effect a shifting of the gear pair 82, 83 of rate changer 56 in either direction. The result is to delay the shifting of the gear pair until time has elapsed for sufficient fluid to pass the needle valve device 199 to move the valve plunger 175 back again to a point where the outlet port 176 is again connected to the pressure port 172. The interval of time before pressure is again established to effect the shifting of piston 169 and gear pair 82, 83 may be varied by adjusting the needle valve.

During the time interval when no fluid is available for the shifting of the gear pair 82, 83, as just described, the connection of the port 176 to the drain 207 has also effected a connection of the motor 108 which temporarily shifts the control ring 69 of rate changer 54 to its slow speed position, irrespective of the position of the speed selector dial 128 and control valve 131. This result is controlled by the valve 142. Plunger 141 of valve 142 is normally maintained to the right, in the position shown in Fig. 9, by pressure fluid applied to the end 208 of the valve plunger through a port 209, a channel 210, and the port 176 of valve 173, but when the plunger 175 of valve 173 is shifted to connect port 176 to the drain port 207, as described, plunger 141 is forced to the left by a spring. This connects the port 140b through groove 140 to a drain port 212, whereby to connect port 111 of motor 108 to the same drain irrespective of the position of control valve 131, and also closes the communication of ports 148a, 148b through the groove 148, whereby to supply pressure to port 112 of motor 108, irrespective of the position of control valve 131. The result of such connection is to cause motor 108 to rotate in a direction to immediately shift the control ring 69 of rate changer 54 to its slow speed position irrespective of the normal controller position and prior to the time when pressure is again established in port 176 of valve 173 to effect the shifting of the gear pair 82, 83 of rate changer 56.

The described shifting of rate changer 54 to slow speed position would, unless prevented, also return the member 133 of valve 131 to its original position, whereas it is necessary that member 133 should remain in the position occupied at the conclusion of the first half dial revolution. To alter the relationship of the connection from member 133 to the rate changer 54, whereby member 133, in the new slow speed position of rate changer 54 will occupy the same position relative to dial 128 that it occupied at the conclusion of the first half revolution, the member 133 is shifted forward a half revolution during the shifting of rate changer 56 to high speed position. For this purpose the piston 169 is connected to member 133 through rack teeth 197 engaging a gear 198 on the cage 163 of the differential device 157, the gearing being such as to effect the desired half revolution in the desired direction.

As previously noted, the shifting of rate changer 56 does not take place until plunger 175 of valve 173 is returned to normal position. Substantially simultaneously the plunger 141 of valve 142 also returns to normal position, whereupon valve 131 resumes control of rate changer 54 and subsequent progressive movement of dial 128 during the second half revolution, similarly to the first half revolution, effects corresponding progressive movement of the rate changer 54 through a second cycle of low speed to high speed position. But since rate changer 56 has been moved to high speed position the second cycle of rate changer 54 progressively effects the high range of spindle speeds. The adjustment of valve member 133 of valve 131 during the shifting of rate changer 56 takes place at a time when the control valve 131 is inoperative to control the position of rate changer 54, as previously explained, and therefore does not cause any undesired adjustment of the rate changer 54.

Following the completion of one revolution of dial 128 to effect the complete range of spindle speeds, as described, the dial is in its original position, ready to start a second revolution. Also the elements of valve 190 are again in the position occupied at the start, and the leakage port 195 again communicates with that groove 191 or 192 which causes the piston 169 to shift the rate changer 56 to slow speed position. At the same time that piston 169 is shifted the connection of the piston rod 167 through the differential device 157 returns the member 133 of valve 131 to the position it occupied at the start of the previous dial rotation, whereby the valve members of valve 131 also occupy the position described at the start of dial rotation. Similarly to the operation at the completion of the first half revolution of the dial the rate changer 54 is shifted to slow speed position before the rate changer 56 is shifted and following the shifting of rate changer 56 the entire rate change mechanism is in its original position for starting a new cycle of spindle speeds, beginning, as before, at the lowest speed and progressively increasing to the highest.

It will be obvious that the operations described to effect the complete series of progressively increasing spindle speeds during the one direction of revolution of dial 128 will operate similarly during opposite direction of dial rotation, but reversely, whereby in the other direction of dial rotation from the position of maximum indicated speed the speeds effected will progressively decrease to the minimum spindle speed. Also that, in either direction of dial rotation, since there are no connections limiting the rate of dial rotation to correspond with rate changer adjustment, the dial may be abruptly shifted from any position to any desired new position and rate changer movements will be forced to follow to effect the new indicated speed as rapidly as the pressure fluid can operate to effect the necessary shifting of the parts. In every case where the new position involves the shifting of rate changer 56 the rate changer 54 will be temporarily shifted to slow speed position irrespective of the dial position during the shifting of the gears, and following the gear shift will again be controlled by the dial position.

As has been previously noted the rate changer 54 is adjustable to effect a zero output speed. This speed position of rate changer 54 will stop rotation of rate changer 56 and spindle 24. A zero spindle speed is not ordinarily required to be included in the speeds indicated on the speed selective device of a machine tool and in this instance the positions of the dial 128 do not include any position operative for the extreme slow speed range of rate changer 54. But to facilitate the shifting of the gear pair 82, 83 of rate changer 56 it is sometimes preferable that the gears should rotate at very slow speed during the shifting. The control mechanism for shift of rate changer 54 to slow speed position prior to the shifting of rate changer 56 is not determined by the speed selector controller, as previously pointed out, but may shift the rate changer 54 to any desired slow speed position irrespective of whether such position is included in the range of adjustment controlled by the position of dial 128. For selection of a desired speed of gears 82, 83 during shifting a stop is provided for adjustably limiting the adjustment of rate changer 54 in slow speed direction, the stop, in this instance consisting of the lock nuts 200, Fig. 5, adjustably threaded on rod 106 to limit the movement of shifter fork 105.

It is to be noted that, while the construction and arrangement of parts as described is such as to permit of continuous rotation of dial 128 in either direction it is sometimes preferable that the controls do not permit of passing directly from highest to lowest speed, or vice versa, at the completion of a dial revolution. In such case a suitable stop (not shown) is provided to limit the movement of the selector shaft and dial. Since such a stop will ordinarily reduce the movement to less than one revolution corresponding modifications are made in the dial graduations and in the connections of motor 108, valves 139, 190, etc. The required character of such modifications being obvious they are not here shown.

Control mechanism is provided for rate changer 54 to relieve the pressure engagement of the frictionally engaged rate change elements, which in this instance are the rolls 68 and ring 69. Such relief of pressure is sometimes desirable during the shifting of the friction elements in order to facilitate and expedite the shifting and to eliminate the wear which might otherwise result from the forcible sliding of the elements on one another while under heavy pressure. It is also sometimes desirable to reduce the pressure of the friction elements during the shifting of the gears of the rate changer 56 in order to insure that the gears are not shifted under heavy load. Both these results are effected by control mechanism as follows:

The rate changer 54, Fig. 6, is provided with fluid operable piston means for the shifting of rolls 68 bodily to the left whereby to decrease the ring contacting diameter thereof. The piston, in this instance, is formed by extending an annular hub 213a on the cage 65, and the cylinder is formed by providing an annular recess 214 in the hub of the yoke member 73, which is slidable on the sleeve portion 65a of cage 65 and connected, as previously described, for shifting the rolls.

Pressure fluid is supplied to cylinder recess 214 by a channel 215, an annular channel 216 and the port 217 of a stationary ring member 218. Port 217 is connected by a channel 219, Figs. 6, 9, to each of the outlet ports 220, 221 of the similar valve devices 222, 223. The valve device 222 includes a valve plunger 24 normally forced to the right to the position shown in Fig. 9, by the pressure in line 121, applied to the end of plunger 224 through a port 225. In this position the plunger closes a pressure port 226, which communicates with pressure line 120 through a channel 227. But if the pressure is relieved in line 121, as for instance when rate changer 54 is to be adjusted in the one direction by motor 108, as previously explained, then a spring 228 forces plunger 224 to the left and pressure port 226 then communicates with the outlet port 220 through an annular plunger groove 229 to supply fluid to the cylinder recess 214 through the channels described, whereby to relieve the pressure between ring 69 and rolls 68. Valve device 223 is operative similarly to the valve 222 during the opposite direction of rate changer adjustment from motor 108, the pressure port 230 being normally closed by valve plunger 231 but being opened to the outlet port 221 by spring 232 when the pressure falls in line 122.

The arrangement just described causes pressure to be relieved betwen the friction elements of rate changer 54 whenever the dial 128 is moved for effecting any speed change. Also when the movement of dial 128 for selection of a new speed requires the shifting of the gears 82, 83 of rate changer 56, one or the other of the supply lines to motor 108 remains connected to a vent during the complete cycle including the shifting of rate changer 54 to the position determined by stop 200, the shifting of gears 82, 83, and the final positioning of rate changer 54 in the adjustment required by the position of the dial, and during all such movements the pressure remains relieved on the friction elements.

To prevent abrupt application of the frictional pressure reengagement of rolls 68 and ring 69 following the relief of pressure as just described, the structure of valves 222 and 223 is such as to trap the fluid in cylinder recess 214 after the valves have both returned to normal position, and the stationary ring member 218 is loosely fitted, whereby leakage may take place at the point where the hub of cage 65 rotates within the ring, to permit the spring 77 to slowly reestablish the friction pressure. By reason of the conical fit of ring member 218 on the rotating hub the rate of such leakage may be adjusted by adjustment of the retaining nut 218a.

Control structure similar to that previously described may be used for controlling a transmission where rate changers similar to 56 include an additional member of rate changers. In Fig. 11 there is shown such a transmission, in which a rate changer 56a provides eight series of speeds, obtained in the different positions of adjustment of the serially arranged gear pairs 234, 235, 236, each having alternative speed positions for engagement of the one or the other gear with the complementary gears of the pairs 237, 238, 239. The resulting eight different speeds are each modified by a rate changer 54a which is similar to the rate changer 54, previously described, and the series of resulting spindle speeds are obtainable in either direction by adjustment of a reverser 55a which may be of any suitable form.

The gear pairs 234, 235, 236, Fig. 11, are respectively provided with shifter piston devices 240, 241, 242, each similar to the piston device 168, the opposite ends of the piston devices being connected respectively to the opposite outlet ports of floating valves 243, 244, 245 each of the same construction as the floating valve 179, and each having its inlet port supplied from the outlet port of a valve 173a which is of the same construction as the valve 173. The supply lines leading from the floating valves 243, 244, 245 to the respective piston devices respectively have associated therewith the poppet valve devices 247, 248, 249 each of the same construction and effect as poppet valve 203, whereby reversal of pressure to any of the piston devices 240, 241, 242 will effect an operation of valve 173a similar to that previously described for valve 173, whereby to control rate changer 54a to be shifted to slow speed position prior to the shifting of any of the gear pairs 234, 235, 236. The supply lines leading from the floating valves 243, 244, 245 to the different piston devices respectively have associated therewith piston position control valves 250, 251, 252, each of the same construction as valve 190 controlled from a selector device 127a which is of the same construction as selector 127.

Where gear pairs are serially arranged as in rate changer 56a, Fig. 11, it is preferable to make the relative speed change effect of the different pairs such that the first pair, in this instance the gear pair 236, is of smallest rate change effect, and succeeding pairs of progressively larger effect. In the present instance, to effect the eight speeds of rate changer 54a, the gear pair 236 is once shifted, gear pair 235 is twice shifted, and gear pair 234 is four times shifted. Since it is desired to effect all these speed positions during a single revolution of selector device 127a and controller shaft 129a the position control valves 250, 251, 252, are geared to shaft 129 to effect such result. Thus the rotating portion of valve 252 is directly fixed on or connected with shaft 129a, similarly to the connection of the rotating portion 196 of valve 190 with shaft 129, previously described. Valve 251 is connected to shaft 129a through a gear pair 253 for two revolutions during one revolution of shaft 129, and valve 250 is connected through the gear pair 253 and another gear pair 254 for four revolutions during one revolution of shaft 129. As a result of this construction one revolution of selector 127a will result in eight speed adjustments of rate changer 56a, respectively timed to occur in proper sequence at each one-eighth of a revolution of the selector.

The rate changer 54a of Fig. 11 is adjusted, similarly to rate changer 54, by the rotation of a motor 108a, which is controlled by a valve 131a of a construction the same as the valve 131. But in this instance the connection of the valve to the motor includes differential connections from each of the three piston devices, whereby to effect eight cycles of movement of rate changer 54a are effected during one revolution of selector 127a. Thus the connection includes the three differential devices 255, 256, 257 each similar in construction to the differential device 157 and respectively suitably connected with the piston rods of piston devices 240, 241, 242, as by the gears 258, 259, 260 and the connections diagrammatically indicated at 261, 262, 263. The differential devices and connections are such that the shifting of the first gear pair 234 effects a one-eighth revolution of the valve member 133a, Fig. 12a, 12b, etc., the shifting of the second gear pair 235 effects a one-quarter revolution of the member 133a and the shifting of the last gear pair 236 effects a one-half revolution of member 133a, whereby as the selector is progressively shifted from minimum speed position through one revolution the leakage port 152a and blocking partition 151a of the valve 131a successively occupy, at the beginning of each successive one-eighth revolution, the positions shown in Figs. 12a to 12h. In this instance, aside from the movement of valve 131a from the piston devices, the connections with rate changer 54a provide for a one-eighth movement of the selector 127a to effect the complete range of speeds of the rate changer.

In each of the valve positions, Figs. 12a to 12h, the rate changer 54a is adjusted to its minimum speed position and will subsequently proceed through a new movement from minimum to maximum speed adjustment as the dial is further progressively rotated to the next succeeding position, in the manner described for the transmission of Fig. 9.

For the modified form of transmission and control mechanism shown in Fig. 11 the motor 108a and rate changer 54a are provided with control valves 125a, 142a, 222a, 223a respectively the same in construction and operation as the valves 125, 142, 222, 223 previously described, and therefore during each adjustment of the rate changer 54a the friction elements thereof will be relieved of pressure engagement, and prior to each shifting of any of the gear pairs 234, 235, 236 the rate changer will be shifted to a predetermined minimum speed position, to be subsequently shifted, following the completion of the gear shift, to the position determined by the adjustment of selector 127a.

It will be apparent that the rate changers 56, 56a are not limited to the use of shiftable gearing, and that the control mechanism here disclosed may also be used for the shifting of clutches having the desired rate change effect. Also that the rate changers 54, 54a may take a variety of forms provided they are adjustable for a desired minimum and maximum speed, and for any speed intermediate therebetween. In the transmission shown in Fig. 11, where the rate changer 56a provides eight speeds, the rate changer 54a may ordinarily be of much less range, while still effecting a given range of combined speeds, than is required in the transmission of Fig. 9, where only two rate changes are provided in the rate changer 56. In other words, the smaller the steps in the speeds obtained from rate changers 56, 56a the less the range required of the rate changers such as 54, 54a. In any case it is preferable that the rate changers 54, 54a should be positioned between rate changer 56, 56a and the power source, and have a slow speed adjustment controlled as described for the transmission of Fig. 9, to facilitate the adjustment of the other rate changer, and to avoid inertia shock which might otherwise be caused by a sudden change of spindle speed.

The selector device 127, Figs. 4, 9, 10 includes a member 128 fixed for rotation with controller shaft 129 which provides a hub portion 265 on which a member 266 is relatively adjustable, being normally retained in adjusted position relative to shaft 129 and member 128 by a spring pressed friction element (not shown), but adjustable by the means of a handle 267. The member 128 carries fixed thereon or integral therewith a portion 128a providing a chart 128b indicated by the heavier numerals of the development of the charts, Fig. 10a, which is graduated with numerical markings representing some of the series of the spindle revolutions available from the transmission, and with intermediate graduations (not shown), all arranged in the manner of a logarithmic scale having a magnitude such that one revolution of the dial indicates the range of spindle speeds available. Chart 128b has its lowest reading at a point to read against indicator pointer 130 when controller shaft 129 is in position to effect the slowest spindle speed, and reading in the direction for pointer 130 to progressively indicate on the chart the spindle speeds effected as the shaft 129 is rotated.

It will be noted that the logarithmic form of markings spaces the graduations representing a given increment of rate change farther apart at the low speed end of the chart than at the high speed end. This is desirable because otherwise a given degree of inaccuracy of adjustment of the selecting and controlling device would result in a greater per centum of error in resulting speed on the lower than on the upper range of the speed indicating device. But in any event it is necessary, for the proper operation of associated charts later described, that equal increments of movement of the controller device, corresponding to the terms of an arithmetical progression, should result in spindle speeds forming the terms of a geometrical series. In order to effect this it results that all of the charts, both the speed chart just described and the charts later described, will normally have markings corresponding to a logarithmic scale.

The construction of rate changer 54 does not normally provide a geometrical increase in speeds during equal increments of adjustment of the speed control ring 69 and, therefore, in order to effect the logarithmic charts, the connections for adjustment of control ring 69 are of special form. In this instance the varying lead of the cam groove 113 of shaft 107 provides the desired result. It will be noted however that the particular rate of increase, or form of groove shown in the drawings is not intended to represent the actual variable lead required, as this will be different for rate changers 54 having different characteristics and may also be changed for other reasons, to produce the desired effect.

Associated with the members 128 and 266 are other selector charts, more particularly shown in Figs. 10a, 10b, 10c. It will be understood that the charts as shown in Figs. 10a, 10b, 10c represent a development in which each chart is given a linear value corresponding to its relative angular value on the selector members.

The member 266, on the end face thereof, is provided with a chart 266a graduated with a logarithmic scale of magnitude of graduations arcuately corresponding to chart 128b, and readable against an indicator pointer 268, Figs. 4, 10c, which is fixed with member 128 to extend through an arcuate slot 269 in member 266. In this instance the graduations and numerical markings of chart 266a represent some of the diameters of cutters to be carried on spindle 24 or on an arbor driven therefrom. It will be understood that the actual chart is intended to provide intermediate graduations (not shown) in the usual manner of a logarithmic scale, indicating intermediate cutter diameters.

The periphery of member 266 is provided with a chart 266b, Figs. 10b, 10a, graduated with a logarithmic scale of a magnitude of graduations arcuately corresponding to the charts 128b and 266a. The range of cutter diameters indicated on chart 266a and of spindle speeds available is such that some or all of the graduations on chart 266b may have two values, one being one hundred times larger than the other. Chart 266b is therefore provided with two sets of numerals respectively indicating the different values. In this instance the graduations and numerical values of chart 266b represent some of the peripheral speeds available for cutters having the diameters indicated on chart 266a, at various rotational speeds. Similarly to the other charts certain intermediate graduations have not been shown, for greater clearness.

It will be understood that Fig. 10b shows chart 266b as it would appear if the overlapping member 128a were removed, while in Fig. 10a the chart 266b is shown as it actually appears, partly exposed by certain portions cut away in the member 128a, and partly hidden by the remaining portions of member 128a. The partial masking of chart 266b by member 128a is for the purpose of avoiding two different values simultaneously visible on chart 266b, and also for avoiding, in any position of chart 266a relative to pointer 268, any readings on chart 266b which represent peripheral speeds which cannot be obtained by the spindle rotational speeds available from the transmission.

The construction and arrangement described is such that chart 128a at all times correctly indicates against pointer 130 the rotational speed of spindle 24, and at the same time chart 266b indicates against the same pointer the peripheral speed of a cutter of the diameter simultaneously indicated on chart 266a by the pointer 268.

For the usual operation of a milling machine, such as shown in Fig. 1, the cutter diameter and desired cutting or peripheral speed is known. With the arrangement of charts as here disclosed the member 266 may be adjusted for pointer 268 to read against any cutter diameter on chart 266a and the speed selector then adjusted for the preferred peripheral speed of the cutter to be indicated on chart 268b against pointer 130, the desired indicated peripheral speed being obtained by the transmission speed adjustment effected in the new speed position of shaft 129, without consideration by the operator of the rotational speed required, although the rotational speed is also simultaneously indicated on chart 264b.

The charts being graduated with logarithmic markings have a base of 10, it results that the numerical values corresponding to the markings of charts 266a, 266b may be read as multiplied by any power of 10, provided the readings of the other chart are similarly considered. Thus the numerical 3 on chart 266a may be considered as 0.3, 3, 30 etc. in which case the indicated values on chart 266b will be similarly multiplied.

By reason of the characteristics of the transmissions herein disclosed, whereby any spindle speed between minimum and maximum are available, any preferred peripheral speed may be very accurately obtained by properly positioning the control shaft 129. The logarithmic charts may, therefore, be constructed with such fineness of spacing of intermediate graduations as may be consistant with normal visibility. Since the production of a machine, other things being equal, depends upon the use of maximum speeds possible for a given set of operating conditions, the use of charts, as here shown, especially in combination with a transmission in which all speeds within the transmission range are immediately available in stepless sequence, normally results in a material increase in production. Cutting speeds may, for instance, be gradually increased, by trial, to a point where the reduced intervals between tool grinding will not warrant further increase.

It will be understood that all of the shifter and control mechanism of Fig. 9, excepting only the portions there shown of the rate changers 56 and 54, and the fluid supply pump and reservoir, are all unitarily carried by the housing member 97. The shifter mechanism for reverser 55 is also carried by the same member. The couplings from the shifter shoe 103 and shifter forks 105, 106 to the members shifted thereby are each of such nature that they are disconnected and connected simultaneously with the removal and replacement of plate member 97. Similarly any fluid channels extending between parts carried on column 20 and parts carried by housing 97 are disconnected and connected simultaneously with the removal and replacement of housing 97. Of such channels there are only two, namely the channel 270, Fig. 6 connecting pump 116 with the safety relief valve 119, and the channel 219 connecting the outlet ports of valves 222 and 223 with the distributor ring 218 of rate changer 54. The channel connection 270 includes two ports 270a, 270b, Fig. 4 which communicate with one another when housing 97 is in place, and respectively communicate, through suitable pipe connections, with pump 116 and with the relief valve 119. The channel 219 is similarly disconnectible and connectible.

What is claimed is:

1. In a transmission and control mechanism the combination of a rate changer having frictionally engaged elements adjustable for relatively high and low speeds and a substantially stepless series of intermediate speeds, indicator means including a speed indicating chart having a range corresponding to said series of speeds and an indicator progressively adjustable relative to said chart, and means connecting said rate changer and indicator means for substantially simultaneous adjustment to corresponding speed and indicator positions respectively, said connecting means including mechanism altering the relative rate of indicator and rate changer adjustment effected at different points in said simultaneous adjustment.

2. In a transmission and control mechanism the combination of a rate changer having frictionally engaged elements adjustable for relatively high and low speeds and a substantially stepless series of intermediate speeds, indicator means including a speed indicating chart having a range corresponding to said series of speeds and an indicator progressively adjustable relative to said chart, and means connecting said rate changer and indicator means for simultaneous adjustment including a power operable shifter for adjustment of said rate changer, a power train, and control means operable in accordance with the movement of said indicator means for connecting said power train and shifter to adjust said rate changer, said connecting means including mechanism altering the relative rate of indicator and rate changer adjustment at different points in said simultaneous adjustment.

3. In a transmission and control mechanism the combination of a rate changer having frictionally engaged elements adjustable for relatively high and low speeds and a substantially stepless series of intermediate speeds, indicating means including a speed indicating chart having a range corresponding to said series of speeds and an indicator progressively adjustable relative to said chart, means normally operative to effect a substantial friction pressure between said frictionally engaged elements, means for adjusting said elements to a speed position corresponding to the speed indicated on said chart, and means operable upon relative movement of said chart and indicator for materially reducing during rate changer adjustment the friction pressure effected by said normally operative means and for restoring said substantial pressure following rate changer adjustment, whereby adjustment of said rate changer to a speed position corresponding to the indicated speed will take place during reduced friction pressure between said elements.

4. In a transmission and control mechanism the combination of a rate changer adjustable for relatively high and low speeds and a substantially stepless series of intermediate speeds, a plurality of charts respectively representing values of different kind, adjustable indicator means for simultaneously determining complementary values on both said charts and means for adjusting said rate changer to a speed position corresponding to one of said complementary values on one of said charts.

5. In a transmission and control mechanism the combination of a rotatable spindle, a transmission for said spindle including a rate changer adjustable for relatively high and low speeds and a series of substantially stepless intermediate speeds, a controller member having a range of progressive movement corresponding to the range of said series of speeds, connections operable in accordance with movement of said controller member for substantially simultaneously with such movement adjusting said rate changer to a speed position corresponding with the position of the controller member, a control device including a plurality of charts respectively having markings representing a series of peripheral speeds and a series of diameters and an indicator relatively movable to be readable against one of said charts, said control device being associated with said controller member for adjustment relative thereto in accordance with the indicator reading on the last mentioned chart, and other indicating means readable against the other of said charts in accordance with said progressive movement of said controller member.

6. A transmission and control mechanism as recited in claim 5 in which said indicator is readable against the chart having markings representing diameters.

7. In a transmission and control mechanism the combination of a first rate change device adjustable through a series of positions collectively effecting a substantially stepless series of speeds, a second rate change device serially connected with said first device and adjustable for relatively high and low speeds, a speed selector including a member progressively shiftable through a range of movement having a plurality of portions each comprising a range of member movement corresponding to said stepless series of speeds, shifter means operable in each portion of selector member movement and in each progressive position of member movement therein to adjust said first device to different rate positions respectively corresponding to the different selector member positions, and shifter means operable to adjust said second device at a point in member movement corresponding to a change from one of said portions to another.

8. In a transmission and control mechanism the combination of a first rate change device adjustable through a series of positions collectively effecting a substantially stepless series of speeds, a second rate change device serially connected with said first device and adjustable for relatively high and low speeds, a speed selector including a member progressively shiftable through a range of movement having a plurality of portions each comprising a range of member movement corresponding to said stepless series of speeds, control means operative in each portion of selector member movement and in each progressive position of member movement therein to adjust said first device to different rate positions respectively corresponding to the different selector member positions, control means operative in accordance with said progressive selector member movement to adjust said second device at a point in member movement corresponding to a change from one of said portions to another, and other control means operative to adjust said first device to low speed position prior to each adjustment of said second device.

9. In a transmission and control mechanism the combination of a first rate change device adjustable through a series of positions collectively effecting a substantially stepless series of speeds, a second rate change device serially connected with said first device and adjustable for relatively high and low speeds, a speed selector including a member progressively shiftable through a range of movement having a plurality of portions each comprising a range of member movement corresponding to said stepless series of speeds, control means operative in each portion of selector member movement and in each progressive position of member movement therein to adjust said first device to different rate positions respectively corresponding to the different selector member positions, control means operative in accordance with said progressive selector member movement to adjust said second device at a point in member movement corresponding to a change from one of said portions to another, and other control means operative to adjust said first device to low speed position prior to each adjustment of said second device, said other control means being rendered inoperative following adjustment of said second device to permit resumed control of said first device by the first mentioned control means.

10. In a transmission and control mechanism the combination of a first rate change device adjustable through a series of positions collectively effecting a substantially stepless series of speeds, a second rate change device serially connected with said first device and adjustable for relatively high and low speeds, a speed selector including a member progressively shiftable through a range of movement having a plurality of portions each comprising a range of member movement corresponding to said stepless series of speeds, power operable shifters respectively for adjustment of said first and second devices, a power train, control means operable in each portion of selector member movement and in each progressive position of member movement therein to connect said power train and the shifter of said first device to effect different rate positions of device adjustment respectively corresponding to the different selector member positions of adjustment, and control means operable to connect said power means and the shifter of said second device at a point in said selector member movement corresponding to a change from one of said portions to another.

11. In a transmission and control mechanism the combination of relatively adjustable frictionally engaged rate change elements and other adjustable rate change means serially arranged, said adjustable elements and other adjustable rate change means being adjustable to a variety of position combinations combinedly productive of a substantially stepless series of speeds, a selector device including a member movable to any position in a range of movement corresponding to the range of said series of speeds, and connections operative for shifting both said frictionally engaged elements and said adjustable rate change means in accordance with the position of said member to effect different speed position combinations thereof respectively corresponding to the different member positions at substantially every point in said range of member movement.

12. In a transmission and control mechanism the combination of relatively adjustable frictionally engaged rate change elements and other adjustable rate change means serially arranged, said adjustable elements and other adjustable rate change means being adjustable to a variety of position combinations combinedly productive of a substantially stepless series of speeds, a selector device including a member movable to any position in a range of movement corresponding to the range of said series of speeds, power operable shifters respectively for said element adjustment and for adjustment of said other rate change means, a power train, and control means operative for connecting said power train and shifters to effect at substantially every point in the movement of said member different speed position combinations respectively corresponding to the different member positions.

13. In a transmission and control mechanism the combination of relatively adjustable frictionally engaged rate change elements and other adjustable rate change means serially arranged, said adjustable elements and other adjustable rate change means being adjustable to a variety of position combinations combinedly productive of a substantially stepless series of speeds, means normally operative to maintain a substantial friction pressure between said elements, a selector device including a member movable to any position in a range of movement corresponding to the range of said series of speeds, connections operative for shifting both said frictionally engaged elements and said adjustable rate change means in accordance with the position of said member to effect different speed position combinations thereof respectively corresponding to the different member positions at substantially every point in said range of member movement, and means operative to materially reduce the pressure effect of said normally operative means during operation of said connections for adjustment of said frictionally engaged elements.

14. In a transmission and control mechanism the combination of a transmission including in the order recited, a clutch, a rate changer including pressure engaged friction elements relatively adjustable for a substantially stepless series of speeds and a second rate changer adjustable for relatively high and low speeds, said rate changers together being adjustable to position combinations combinedly effecting an enlarged series of speeds, a speed selector including a member movable through a range corresponding to said enlarged series of speeds, shifter means operative in accordance with movement of said member for shifting said rate changers to effect said position combinations in an order corresponding to the numerical values of the speeds of said enlarged series, shifter means operative in accordance with movement of said member to adjust said friction elements to a low speed position at points in the member movement effective for shifting said second rate changer, whereby to facilitate the adjustment of said second rate changer without necessity for disturbing an engaged position of said clutch, and means operative during operation of the last mentioned shifter means for materially reducing the pressure of said element engagement.

15. In a transmission and control mechanism the combination of a first rate changer adjustable for a substantially stepless series of speeds, a serially connected second rate changer adjustable for relatively high and low speeds, said rate changers together being adjustable to position combinations combinedly effecting an enlarged series of speeds, a speed selector for said transmission including a member movable through a range corresponding to said enlarged series of speeds, shifter means operative in accordance with movement of said member for shifting said rate changers to effect said position combinations in an order corresponding with the numerical values of the speeds of said enlarged series, and shifter means operative to adjust said first rate changer to a low speed position independently of the member position at points in the member movement effective for shifting said second rate changer and subsequently to shift said first rate changer to a position corresponding to the member position.

16. In a transmission and control mechanism the combination of a first rate change device adjustable through a series of positions collectively effecting a substantially stepless series of speeds, a second rate change device serially connected with said first device and adjustable for high and relatively low speeds, a speed selector including a member progressively shiftable through a first and second portion of movement between spaced positions, means operative in each portion of said progressive movement of the selector member to adjust said first device to effect a different speed position in each member position collectively effecting said series of speed positions, and means operative in accordance with said progressive member movement for abruptly adjusting said second device at a point following the completion of one of said series of speed positions and substantially simultaneously adjust said first device from high to low speed position.

17. In a transmission and control mechanism the combination of a rate selector device including a member movable to substantially all intermediate positions between spaced positions thereof, a plurality of adjustable rate change devices serially arranged and collectively adjustable to a variety of speed position combinations, and connections from said member to each of said rate change devices, said connections being operative in any change of position of said member to effect a correspondingly different speed position combination of said rate change devices.

18. In a transmission and control mechanism the combination of rate change means adjustable for relatively high and low speeds and a series of substantially stepless intermediate speeds, rate selector means including a chart having a range corresponding to said series of speeds and indicator means adjustable relative to said chart, and means connecting said rate changer means and selector means for substantially simultaneous adjustment to corresponding rate and indicating positions respectively, said connecting means including mechanism for different relative rates of adjustment of said indicating means and rate change means at different points in said simultaneous adjustment.

19. In a transmission and control mechanism the combination of a rate changer including a plurality of elements frictionally engaged and relatively adjustable to different positions respectively to effect different rates, means normally operative for effecting a pressure engagement of said elements, a speed selector device movable to different positions respectively for effecting different of said element positions, and means for materially reducing the pressure effect of said normally operative means upon movement of said selector device from one to another of its positions.

20. In a transmission and control mechanism the combination of a first rate change device adjustable through a series of positions collectively productive of a substantially stepless series of speeds, a second rate change device serially connected with said first device and adjustable for high and relatively low speeds, said devices being collectively adjustable to a variety of position combinations collectively effecting an enlarged series of stepless speeds, a speed selector including a member progressively movable through a range of movement corresponding to said enlarged series of speeds, a plurality of power operable shifters respectively for adjustment of said first and second device, and means controlling the power connection of said shifters to effect a different one of said position combinations in substantially every different position of said progressive member movement, said progressive member movement effecting the different position combinations in the numerical order of the speeds resulting therefrom.

21. In a transmission and control mechanism the combination of a first rate change device adjustable through a series of positions collectively productive of a substantially stepless series of speeds, a second rate change device serially connected with said first device and adjustable for high and relatively low speeds, said devices being collectively adjustable to a variety of position combinations collectively effecting an enlarged series of stepless speeds, a speed selector including a member progressively movable through a range of movement corresponding to said enlarged series of speeds, a plurality of fluid operable shifters respectively for adjustment of different of said devices, a pressure fluid source connectible with said shifters, and valve means operative in accordance with said selector member movement to connect said source and shifters to effect a different position combination of said devices in substantially every different position of said progressive member movement, said progressive member movement effecting the different position combinations in the numerical order of the speeds resulting therefrom.

22. In a transmission and control device the combination of a first rate change device adjustable to a series of positions productive of a substantially stepless series of speeds, a second rate change device serially connected with said first device and adjustable for a high and a relatively low speed, said devices being collectively adjustable to variety of position combinations collectively resulting in an enlarged series of stepless speeds, a speed selector device including a member progressively movable through a range of movement corresponding with said enlarged series of speeds, means operative in accordance with said member movement to effect a different position combination of said devices in substantially every position of said progressive movement, said progressive member movement effecting the different position combinations of said devices in an order corresponding to the numerical value of the speeds resulting therefrom.

23. In a transmission and control mechanism the combination of a first rate change device adjustable through a series of positions collectively effecting a substantially stepless series of speeds, a second rate change device serially connected with said first device and adjustable for high and relatively low speeds, a speed selector including a member progressively movable between different positions, means operative in accordance with said progressive member movement to adjust said second device at each of spaced points in the member movement, means operative prior to each adjustment of said second device to adjust said first device to a low speed position irrespective of the position of said member, and means operative subsequent to each adjustment of said second device to adjust said first device to a position corresponding to the position of said member.

24. In a transmission and control mechanism the combination of a first rate change device adjustable through a series of positions effecting a substantially stepless series of speeds, a second rate change device serially connected with said first device and adjustable for high and relatively low speeds, a speed selector including a member progressively movable between different positions, said devices being shiftable to a series of speed position combinations collectively corresponding to substantially all the intermediate positions of said selector member, and shifter means operative in accordance with member movement in substantially any intermediate position of said selector member to effect a corresponding position combination of said devices.

25. In a transmission and control mechanism the combination of a first rate change device adjustable through a series of positions effecting a substantially stepless series of speeds, a second rate change device serially connected with said first device and adjustable for high and relatively low speeds, a speed selector including a member progressively movable between different positions, said devices being shiftable to a series of speed position combinations collectively corresponding to substantially all the intermediate position of said selector member, shifter means operative in accordance with member movement in substantially any intermediate position of said selector member to effect a corresponding position combination of said devices, and shifter means including means for shifting said first device to a slow speed position independently of the member position before the shifting of the other device.

26. In a transmission and control mechanism the combination of a transmission including a power source, a main clutch, a first rate change device and a second rate change device serially arranged in the order recited, said first device comprising engaged friction elements adjustable to effect a minor series of speeds including relatively high and low speeds and substantially all intermediate speeds, said second device including elements relatively adjustable for relatively high and low speeds, said devices being collectively adjustable to effect various combinations of adjustment positions collectively effecting a substantially stepless major series of speeds, a speed selector including a member movable through all intermediate positions in a range of movement corresponding to said major series of speeds, shifter means operative in accordance with the movement of said member in substantially any intermediate member position to effect a corresponding adjustment position combination of said devices, and shifter means operative for adjusting said first device to a slow speed position independently of said member position before each adjustment of said second device.

27. In a transmission and control mechanism the combination of a first rate change device including frictionally pressure engaged elements relatively shiftable to positions collectively effecting a substantially stepless series of speeds, a second rate change device serially connected with said first device and adjustable for high and relatively low speeds, a speed selector including a member progressively movable between different positions, shifter means operative in substantially any change of position of said member to effect a correspondingly different position combination of said devices, and shifter means operative before any shift of said second device to shift said first device to a slow speed position independently of the position of said member and subsequently to shift said first device to a position corresponding to the member position.

28. In a transmission and control mechanism the combination of a first rate change device including frictionally pressure engaged elements relatively shiftable to positions collectively effecting a substantially stepless series of speeds, a second rate change device serially connected with said first device and adjustable for high and relatively low speeds, a speed selector including a member progressively movable between different positions, shifter means operative in substantially any change of position of said member to effect a corresponding position combination of said devices, and means for materially reducing the friction pressure of said frictionally engaged elements before adjustment of said first device.

29. In a transmission and control mechanism the combination of a first rate change device including frictionally pressure engaged elements relatively shiftable to positions collectively effecting a substantially stepless series of speeds, a second rate changer serially connected with said first device and adjustable for high and relatively low speeds, a speed selector including a member progressively movable between different positions, shifter means operative in substantially any change of position of said member to effect a corresponding position combination of said devices, means operative before any shift of said second device to shift said first device to a slow speed position, and means operative to materially reduce the friction pressure of said frictionally engaged elements during any change in adjustment of said elements.

30. In a transmission and control mechanism the combination of a transmission including gearing, a rate changer connected to drive said gearing including elements frictionally engaged and relatively adjustable to effect a stepless series of rates, means normally effecting a substantial friction pressure between said elements, adjusting means for said elements including a movable member, and means operative upon movement of said member for materially reducing the pressure effect of said normally operative means during element adjustment.

31. In a transmission and control mechanism the combination of a rate changer including elements abruptly adjustable for effecting material changes of rate, driving means for said rate changer including a device adjustable for relatively high and low speeds, a rate controller including chart and indicator means relatively movable to different positions for effecting different speed adjustments of said elements, means operative for effecting adjustment of said device from said high speed position to said low speed position independently of the position of said chart and indicator means before each adjustment of said elements, and means subsequently operative to adjust said device to high speed position.

32. In a transmission and control mechanism the combination of a first rate change device adjustable to positions effecting a substantially stepless series of speeds, a second rate change device serially connected with said first device and adjustable for high and relatively low speeds, a speed selector including a scale having logarithmically arranged markings over a range materially greater than said series of speeds and indicator means movable relative to said scale, means operative during movement of said scale and indicator means over a first portion of said scale to adjust said first device through positions effecting said series of speeds in an order corresponding to said markings to effect an end speed of said series, means for subsequently substantially simultaneously adjusting said second device and reversely adjusting said first device to effect the other end speed of said series, and means operative during movement of said chart and indicator means over a second portion of said scale to again adjust said first device through positions effecting said series of speeds in an order corresponding to said markings.

33. In a transmission and control mechanism the combination of a first rate change device adjustable to positions effecting a substantially stepless series of speeds, a second rate change device serially connected with said first device and adjustable for relatively high and low speeds, a speed controller including movable indicator means, means operative during a first portion of indicator movement to adjust said first device from an initial position through positions effecting said series of speeds, means operative at the end of said first portion of indicator movement for abruptly adjusting said second device and reversely adjusting said first device to its initial position, and means operative during a second portion of indicator movement to again adjust said first device from said initial position through positions effecting said series of speeds in the same order as during the first portion of indicator movement.

34. In a transmission and control device the combination of a first rate change device adjustable through a substantially stepless series of speeds, a second rate change device adjustable for relatively high and low speeds, a speed selector including chart and indicator means progressively relatively movable through a first and second portion of movement between spaced positions, an operative connection from said chart and indicator means for forward adjustment of said first device in each portion of said progressive movement to effect different speeds in each chart and indicator position and collectively effecting said series of speeds, another operative connection from said chart and indicator means for adjustment of said second device following completion of one of said portions of chart and indicator movement and substantially simultaneously reversely shifting said first device to effect an end speed of said series.

35. In a transmission and control mechanism the combination of rate change means adjustable for relatively high and low speeds and a substantially stepless series of intermediate speeds, shifter means for adjustment of said rate changer including a member adjustable in a substantially linear path, selector means including relatively rotatable chart and indicator devices, and a train connecting said shifter member and selector means including mechanism altering the relative rate of said linear and rotary movement during adjustment of said rate changer through said series of speeds.

36. In a transmission and control mechanism the combination of rate change means including a plurality of rate change devices arranged in serial driving order and shiftable into various position combinations respectively productive of different speeds having a predetermined range and having a ratio corresponding to terms of a geometrical progression when said devices are driven at constant speed, and drive means for said plurality of rate change devices including another rate change device adjustable to effect a substantially stepless series of speeds, said stepless series of speeds being of sufficient range to effect together with the first mentioned rate change devices a series of transmission speeds having a range greater than said predetermined range by an amount substantially corresponding to an increase of one term of said geometrical progression.

37. In a transmission and control mechanism the combination of rate change means including a plurality of rate change devices arranged in serial driving order and shiftable into various position combinations respectively productive of different speeds having a predetermined range and corresponding to terms of a geometrical progression when said devices are driven at constant speed, drive means for said plurality of rate change devices including another rate change device adjustable to effect a substantially stepless series of speeds, said stepless series of speeds being of sufficient range to effect together with the first mentioned rate change devices a series of transmission speeds having a range greater than said predetermined range by an amount substantially corresponding to an increase of one term of said geometrical progression, and control means for said transmission including an adjustable speed selector device and motion transmitting connections for each of said rate change devices and operable in accordance with adjustment of said selector device.

38. In a transmission and control mechanism the combination of a first rate change device shiftable to a plurality of positions respectively productive of different speeds having a predetermined range and having a ratio corresponding to different terms of a geometrical progression when said first device is driven at a constant speed, drive means for said first device including a second rate change device adjustable for a substantially stepless series of speeds, said stepless series being of sufficient range to effect together with said first device a series of transmission speeds having a range greater than said predetermined range by approximately one term of said geometrical progression, control means including an adjustable speed selector device, and motion transmitting connections for each of said rate change devices operable in accordance with the adjustment of said speed selector device.

39. A transmission and control mechanism as specified in claim 38 in which the motion transmitting connection operative on said second device includes elements cooperating to change the relative ratio of selector adjustment and rate changer adjustment to effect different ratios at different speed positions of the selector.

40. In a transmission and control mechanism the combination of a first rate change device shiftable to a plurality of positions respectively productive of different speeds having a predetermined range and having a ratio corresponding to different terms of a geometrical progression when said first device is driven at a constant speed, drive means for said first device including a second rate change device adjustable for a substantially stepless series of speeds, said stepless series being of sufficient range to effect together with said first device a series of transmission speeds having a range greater than said predetermined range by approximately one term of said geometrical progression, speed selector means adjustably determinative of the adjustment of said rate changers, and means operative in advance of the adjustment of said first device to adjust said second device to a relatively low speed position and subsequently to effect the speed position of said second device in accordance with the adjustment of said speed selector means.

41. In a transmission and control mechanism the combination of a first rate change device shiftable to a plurality of positions respectively productive of different speeds having a predetermined range and having a ratio corresponding to different terms of a geometrical progression when said first device is driven at a constant speed, drive means for said first device including a second rate change device adjustable for a substantially stepless series of speeds, said stepless series being of sufficient range to effect together with said first device a series of transmission speeds having a range greater than said predetermined range by approximately one term of said geometrical progression, and a speed controller including relatively movable speed chart and indicator elements and including motion transmitting connection for said first device operative for adjustment thereof at spaced points in the chart and indicator element movement having a spacing representing speeds differing by one of the terms of said geometrical progression, said controller also including a motion transmitting connection for said second device operative for adjustment thereof in accordance with the position of said chart and indicator element movement at substantially all intermediate positions between said spaced points.

42. In a transmission and control mechanism the combination of a first rate change device shiftable to a plurality of positions respectively productive of different speeds having a predetermined range and having a ratio corresponding to different terms of a geometrical progression when said first device is driven at a constant speed, drive means for said first device including a second rate change device adjustable for a substantially stepless series of speeds, said stepless series being of sufficient range to effect together with said first device a series of transmission speeds having a range greater than the speeds of said predetermined range by approximately one term of said geometrical progression, a speed selector including a member shiftable through a range of movement corresponding to one of the terms of said geometrical progression, a motion transmitting connection operable to adjust said first rate change device at each end of said speed selector member movement, and a motion transmitting connection operable in accordance with the position of said selector member to adjust said second rate change device to different positions collectively effective for said stepless series of speeds.

43. In a transmission and control mechanism the combination of a first rate change device shiftable to a plurality of positions respectively productive of different speeds having a predetermined range and having a ratio corresponding to different terms of a geometrical progression when said first device is driven at a constant speed, drive means for said first device including a second rate change device comprising pressure engaged friction elements relatively adjustable for a substantially stepless series of speeds, said stepless series being of sufficient range to effect together with said first device a series of transmission speeds of a range greater than said predetermined range by approximately one term of said geometrical progression, control means including an adjustable speed selector device, and motion transmitting connections for each of said rate change devices operable in accordance with the adjustment of said selector device.

44. A transmission and control mechanism as specified in claim 43 including control means operated during adjustment of said second rate change device to materially reduce the pressure engagement of the friction elements thereof, and subsequently operative to restore the previous pressure engagement.

45. In a transmission and control mechanism the combination of a first rate change device shiftable to a plurality of positions respectively productive of different speeds having a predetermined range and having a ratio corresponding to different terms of a geometrical progression when said first device is driven at a constant speed, drive means for said first device including a second rate change device comprising pressure engaged friction elements relatively adjustable for a substantially stepless series of speeds, said stepless series being of sufficient range to effect together with said first device a series of transmission speeds of a range greater than said predetermined range by approximately one term of said geometrical progression, control means including an adjustable speed selector device, motion transmitting connections for each of said rate change devices operable in accordance with the adjustment of said selector device, and control means operative during adjustment of said second rate change device to materially reduce the pressure engagement of the friction element thereof and to subsequently restore the previous pressure engagement, said motion transmitting connection operative on said second rate change device including elements operative to change the relative ratio of selector adjustment and rate change device adjustment to effect different ratios at different speed positions of the selector.

46. In a transmission and control mechanism the combination of a first rate change device shiftable to a plurality of positions respectively productive of different speeds having a predetermined range and having a ratio corresponding to different terms of a geometrical progression when said first device is driven at a constant speed, and drive means for said first device including a second rate change device adjustable for a substantially stepless series of speeds, said stepless series of speeds being of sufficient range to effect together with said first device a series of transmission speeds having a range greater than said predetermined range by approximately one term of said geometrical progression.

47. In a transmission and control mechanism the combination of a first rate change device shiftable to a plurality of positions respectively productive of different speeds having a predetermined range and having a ratio corresponding to different terms of a geometrical progression when said first device is driven at a constant speed, and drive means for said first device including a second rate change device adjustable for a substantially stepless series of speeds, said stepless series of speeds being of sufficient range to effect together with said first device a series of transmission speeds having a range greater than said predetermined range by approximately one term of said geometrical progression, and means visually indicating the combined speed result of said rate change devices in various position combinations thereof.

FRED A. PARSONS.